(12) United States Patent
Lakshminarayana et al.

(10) Patent No.: US 6,308,313 B1
(45) Date of Patent: Oct. 23, 2001

(54) METHOD FOR SYNTHESIS OF COMMON-CASE OPTIMIZED CIRCUITS TO IMPROVE PERFORMANCE AND POWER DISSIPATION

(75) Inventors: Ganesh Lakshminarayana; Anand Raghunathan, both of Plainsboro; Kamal S. Khouri; Niraj K. Jha, both of Princeton, all of NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/328,897

(22) Filed: Jun. 9, 1999

(51) Int. Cl.[7] .................................................. G06F 17/10
(52) U.S. Cl. ..................................... 716/18; 716/2; 716/3
(58) Field of Search ......................................... 716/18, 2, 3

(56) References Cited

U.S. PATENT DOCUMENTS

| | | | |
|---|---|---|---|
| 5,408,663 | * | 4/1995 | Miller .................................... 709/104 |
| 5,692,193 | * | 11/1997 | Jagannathan et al. ................. 709/106 |
| 5,768,594 | * | 6/1998 | Blelloch et al. .......................... 717/6 |
| 5,831,863 | * | 11/1998 | Scepanovic et al. ..................... 716/2 |
| 5,870,308 | * | 2/1999 | Dangelo et al. ......................... 716/18 |
| 6,086,628 | * | 7/2000 | Dave et al. ............................... 716/7 |
| 6,173,435 | * | 1/2001 | Dupenloup ............................. 716/18 |
| 6,216,252 | * | 4/2001 | Dangelo et al. .......................... 716/1 |

OTHER PUBLICATIONS

Brown et al, "Scheduling for Power Reduction in a Real–Time System," IEEE, 1997, pp. 84–87.*
Tomiyama et al, "Instruction Scheduling for Power Reduction in Processor–Based System Design," IEEE, 1998, pp. 885–860.*
Yu et al, "Loop Schedule Algorithms for Power Reduction," IEEE, 1998, pp. 3073–3076.*
Khouri et al, "Impact: A High–Level Synthesis System for Low Power Control–Flow Intensive Circuits," IEEE, Feb. 1998, pp. 848–854.*
Lakshminarayana et al, "Fact: A Framefork for Applying Throughout and Power Optimizing Transformations to Control–Flow–Intensive Behavior Descriptions," IEEE, Nov. 1999, pp. 1577–1594.*
S. Devadas and S. Malik, "A Survey of Optimization Techniques Targeting Low Power VLSI Circuits," in Proc. Design Automation Conf., pp. 242–247, Jun. 1995.
A. Raghunathan, S. Dey, and N. K. Jha, "Glitch Analysis and Reduction in Register Transfer Level Power Optimization," in Proc. Design Automation Conf., pp. 331–336, Jun. 1996.

(List continued on next page.)

Primary Examiner—Matthew Smith
Assistant Examiner—Vuthe Siek
(74) Attorney, Agent, or Firm—Sughrue, Mion, Zinn, Macpeak & Seas, PLLC

(57) ABSTRACT

A method for designing a circuit with reduced power consumption using a Common-Case Computation (CCC) based design. The method comprising identifying a set of common case computations from a schedule of the circuit, designing add on common detection circuit that detects the set of common case computations, designing add on common case execution circuit that executes the set of common case computations; and integrating the add on circuitry with the original circuit. A circuit design system for optimizing a circuit for power management comprising: a simulator for simulating a schedule with input traces based on a given RTL design, schedule and typical input traces; a state sequence identifier for identifying promising state sequence patterns from simulated schedules; a behavior extractor for extracting behavior corresponding to each identified state sequences; a pattern selector for choosing a best pattern; a synthesizer for synthesizing common case circuitry; and an output generator for integrating common case circuitry with an original circuit.

9 Claims, 11 Drawing Sheets

OTHER PUBLICATIONS

M. Ohnishi et al., "A Method of Redundant Clocking Detection and Power Reduction at RT Level Design," in Proc. Int. Symp. Low Power Electronics & Design, pp. 131–136, Aug. 1997.

J. A. Fisher, "Trace Scheduling: A Technique for Global Microcode Compaction," IEEE Trans. Computers, vol. 30, pp. 478–490, Jul. 1981.

L. Benini, et al., "Telescopic Units: A New Paradigm for Performance Optimization of VLSI Designs," IEEE Trans. Computer–Aided Design, vol. 17, pp. 220–232, Mar. 1998.

S. Hassoun and C. Ebeling, "Architectural Retiming: Pipelining Latency–Constrained Circuits," In Proc. Design Automation Conf., pp. 708–713, Jun. 1996.

S. K. Bommu et al., "Retiming–Based Factorization for Sequential Logic Optimization," ACM Trans. Design Automation Electronic Systems, Aug., 1998.

M. Aldina, et al., "Precomputaion–Based Sequential Logic Optimization for Low Power," IEEE Trans. VLSI Systems, vol. 2, pp. 426–436, Dec. 1994.

H. Trickey, "Flamel: A High–Level Hardware Compiler," IEEE Trans. Computer–Aided Design, vol. 6, pp. 259–269, Mar. 1987.

A. P. Chandrakasan, et al., "Optimizing Power Using Transformations," IEEE Trans. Computer–Aided Design, vol. 14, pp. 12–31, Jan. 1995.

M. S. Lam and R. P. Wilson, "Limits of Control Flow on Parallelism," in Proc. Annual Symp. Comput. Arch., pp. 46–57, 1992.

A. Chaterjee and R. Roy, "Synthesis of Low Power Linear DSP Circuits Using Activity Metrics," In Proc. Intl. Conf. VLSI Design, pp. 255–270, Jan. 1994.

G. Lakshminarayana and N. Jha, "FACT: A Framework for the Application of Throughput and Power Optimizing Transformations to Control–Flow Intensive Behavioral Descriptions," in Proc. Design Automation Conf., pp. 102–107, Jun. 1998.

* cited by examiner

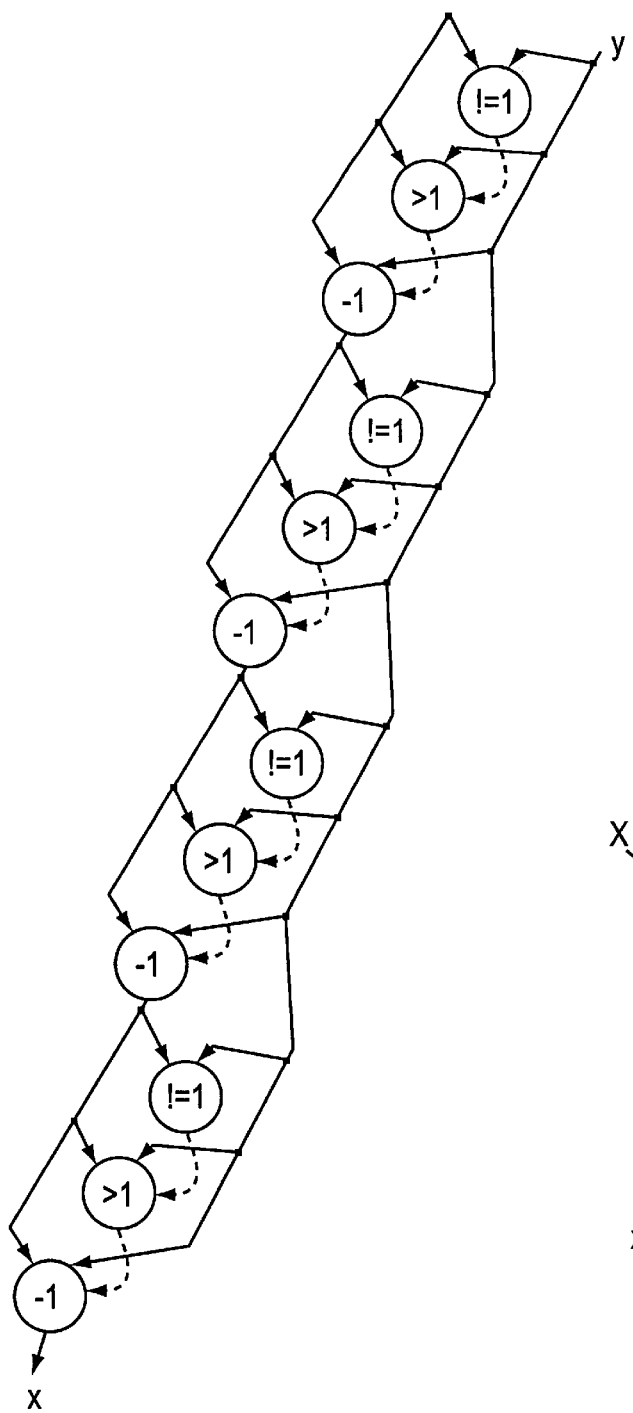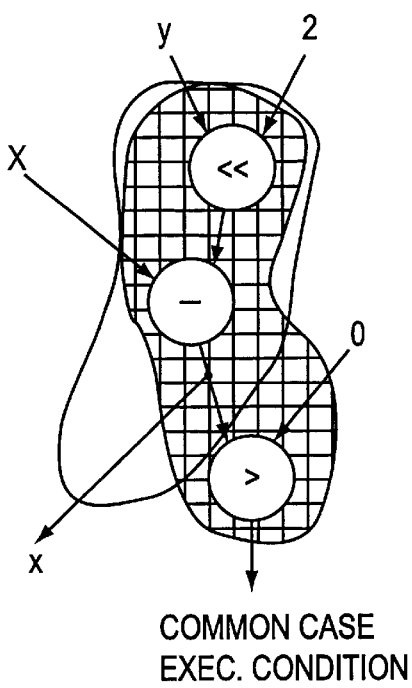
FIG. 2A
FIG. 2B

ORIGINAL CIRCUIT

COMMON CASE DETECTION CIRCUIT

METHOD FOR SYNTHESIS OF COMMON-CASE OPTIMIZED CIRCUITS TO IMPROVE PERFORMANCE AND POWER DISSIPATION

I. DESCRIPTION OF THE INVENTION

IA. Field of the Invention

This invention is related to high-performance low-power VLSI designs. Specifically, the present invention is related to a technique for synthesizing common-case computation (CCC) circuits with reduced power consumption. The present invention is embodied in methods and a system for designing a circuit with reduced power consumption. This Application is related to the concurrently filed U.S. application Ser. No. 09/328,896, by Lakshminarayana et al.

IB. Background of the Invention

It is a well-known fact that in behavioral descriptions of hardware circuits, a small set of computations, the common case computations (CCCs) often account for most of the computational complexity. This is also true for software programs. However, in the hardware implementations (structural level, RTL level or lower level), the common case computations and the remaining computations are typically treated alike.

Various conventional low-power and high-performance circuit architectures have been proposed at various levels of design abstraction. These include:

Parallel and pipelined circuit architectures for high-performance circuits and low-power circuits. See D. A. Patterson and J. L. Hennessy, *Computer Architecture: A Quantitative Approach*. Morgan Kaufman Publishers. San Mateo, Calif., 1989; See A. R. Chandrakasan and R. W. Brodersen, *Low Power Digital CMOS Design*. Kluwer Academic Publishers, Norwell. Mass. 1995.

Gated clock architectures that have reduced power consumption by eliminating unnecessary signal transitions in the clock network and registers. See L. Benini, P. Siegel, and G. DeMicheli, "Saving power by synthesizing gated clocks for sequential circuits," *IEEE Design & Test of Computers*, pp. 32–41, Winter 1994; and L. Benini and G. DeMicheli, "Automatic synthesis of gated-clock sequential circuits," *IEEE Trans. Computer-Aided Design*. vol. 15, pp. 630–643, June 1996. Pre-computation architectures that compose a circuit block with predictor circuits that are then used to disable the original circuit and reduce power consumption. See M. Aldina, J. Monteiro, S. Devadas, A. Ghosh, and M. Papaefthymiou, "Precomputation-based sequential logic optimization for low power," *IEEE Trans. VLSI Systems*, vol. 2. pp. 426–436. Dec. 1994.

Telescopic unit architectures for variable latency pipeline stages. See L. Benini. F. Macu, M. Poncino, and G. De Micheli. "Telescopic units: A new paradigm for performance optimization of VLSI designs," *IEEE Trans. Computer-Aided Design*, vol. 17, pp. 220–232, Mar. 1998.

Operand isolation architectures that include transparent latches at the inputs of selected embedded logic blocks, and additional control circuitry to detect idle conditions for the logic block. See A. Correale Jr. Overview of the power minimization techniques employed in the IBM PowerPC 4xx embedded processors," in *Proc. mt. Symp. Low Power Design*, pp. 75–80, April 1995; V. Tiwari, S. Malik, and P. Ashar, "Guarded evaluation: Pushing power management to logic synthesis/design," in *Proc. Int. Syrnp. Low Power Design.* pp. 221–226, April 1995; and J. Mouteiro, J. Rinderknecht, S. Devadas, and A. Ghosh, Optimization of combinational and sequential logic circuits for low power using pre-computation." in *Proc. Chapel Hill Conf. Advanced Research VLSI*, pp. 430–444. March 1995. The additional control circuitry disables the transparent latches at a logic block's inputs from unnecessarily changing values when the logic block is idle.

It is well known that providing the flexibility of affecting or performing design decisions at the higher levels of design hierarchy, to a designer or a CAD tool, can lead to realizing larger savings in power consumption. See A. R. Chandrakasan and R. W. Brodersen, *Low Power Digital CMOS Design*. Kluwer Academic Publishers, Norwell, Mass., 1995; Rabaey and M. Pedram (Editors), *Low Power Design Methodologies*. Kluwer Academic Publishers, Norwell, Mass., 1996; L. Benini and G. De Micheli, *Dynamic Power Management: Design Techniques and CAD Tools*. Kluwer Academic Publishers, Norwell, Mass., 1997; and A. Raghunathan, N. K. Jha, and S. Dey, *High-level Power Analysis and Optimization*. Kluwer Academic Publishers, Norwell, Mass., 1998. Recognizing this fact, various low-power design and CAD techniques have been proposed at the register-transfer, behavior, and system levels. These techniques include:

logic synthesis for low power techniques See J. Rabaey and M. Pedram (Editors), Low Power Design Methodologies. Kluwer Academic Publishers, Norwell, Mass., 1996; S. Devadas and S. Malik, "A survey of optimization techniques targeting low power VLSI circuits," in Proc. Design Automation Conf., pp. 242–247, June 1995 and J. Monteiro and S. Devadas, Computer-Aided Design Techniques for Low Power Sequential Logic Circuits, Kluwer Academic Publishers, Norwell, Mass., 1996. RTL transformations to optimize power. See A. Raghunathan, S. Dey, and N. K. Jha, "Glitch analysis and reduction in register-transfer-level power optimization," in Proc. Design Automation Con!., pp. 331–336, June 1996; and M. Ohnishi, A. Yamada, H. Nods, and T. Kambe, "A method of redundant clocking detection and power reduction at RT level design," in Proc. int. Symp. Low Power Electronics & Design, pp. 131–136, August 1997;

techniques to perform the conventional high-level synthesis tasks targeting low power dissipation. See A. R. Chandrakasan and R. W. Brodersen, Low Power Digital CMOS Design. Kluwer Academic Publishers, Norwell, Mass., 1995; and Rabaey and M. Pedram (Editors), Low Power Design Methodologies. Kluwer Academic Publishers, Norwell, Mass., 1996; and A. Raghunathan, N. K. Jha, and S. Dey, High-level Power Analysis and Optimization. Kluwer Academic Publishers, Norwell, Mass., 1998; and techniques to apply power management (elimination of idle circuit activity) at the RTL and during high-level synthesis. See L. Benini and G. De Micheli, Dynamic Power Management: Design Techniques and CAD Tools. Kluwer Academic Publishers, Norwell, Mass., 1997; and A. Raghunathan, N. K. Jha, and S. Dey, High-level Power Analysis and Optimization. Kluwer Academic Publishers, Norwell, Mass., 1998.

In an implementation derived without particular attention to the common case, the delay and power expended in executing the CCCs may be significantly higher than necessary due to one or more of the following factors:

Various synthesis optimizations, which may not be applicable in the context of the complete design, are applicable when only the CCCs are considered. For example, a CCC typically consists of only one or a few (conditional) threads of execution from the original behavior. Thus, a substantial quantity of control-flow constructs, which are known to be bottlenecks for various high-level optimizations are eliminated by considering the CCC alone. See D. D Gajski, N. D. Dutt, A. C.-H. Wu, and S. Y.-L. Lin, *High-level Synthesis: Introduction to Chip and System Design.* Kluwer Academic Publishers, Norwell, Mass., 1992; and G. De Micheli, *Synthesis and Optimization of Digital Circuits.* McGraw-Hill, New York, N.Y., 1994.

In conventional implementations, sharing of CCC operations with non-CCC operations may result in a significant amount of additional circuitry and parasitics being associated with the execution of CCCs (e.g., additional multiplexers and control circuitry, and larger clock networks and global buses). A separate implementation of the CCC alone would avoid these above problems.

It is well known that a significant fraction of (dynamic) power consumed in typical circuits is due to switching activity in unused circuitry. Although various power management techniques have been proposed to reduce such unnecessary power, they do not guarantee its elimination, and themselves incur overheads by inserting additional circuitry. See L. Benini and G. De Micheli, *Dynamic Power Management: Design Techniques and CAD Tools.* Kluwer Academic Publishers, Norwell, Mass., 1997; A. Raghunathan, N. K. Jha, and S. Dey, *High-level Power Analysis and Optimization.* Kluwer Academic Publishers, Norwell, Mass., 1998; and G. Yeap, Practical Low Power Digital VLSI Designs. Kluwer Academic Publishers, Norwell, Mass., 1998. In practice, a non-CCC-optimized design will inevitably dissipate some amount of power in circuitry unrelated to CCCs while executing the CCCs. CCC-based design naturally and completely avoids such unnecessary power.

Since the CCCs result in a much smaller circuit than the complete design, sub-optimal (heuristic) synthesis algorithms often tend to perform better on the CCCs than when these algorithms are presented to large monolithic designs. Conversely, more aggressive and computationally intensive synthesis/optimization algorithms may be used to optimize CCCs.

CCCs have been exploited in various related areas of research. The observation that often under 10% of a program's instructions account for over 90% of its execution time has been exploited in the context of high-performance processor and compiler design. See D. A. Patterson and J. L. Hennessy, *Computer Architecture: A Quantitative Approach.* Morgan Kaufman Publishers, San Mateo, Calif., 1989; and J. A. Fisher, 'Trace scheduling: A technique for global microcode compaction," *IEEE Trans. Computers,* vol. 30, pp. 478–490, July 1981. As a popular example, one of the arguments driving the evolution of Reduced Instruction Set Computer (RISC) architectures was that RISCs allowed for simplified implementations of frequently occurring instructions. See D. A. Patterson and J. L. Hennessy, *Computer Architecture: A Quantitative Approach.* Morgan Kaufman Publishers, San Mateo, Calif., 1989. Trace scheduling method exploited CCCs by compacting frequently occurring program threads using code motion. See J. A. Fisher, 'Trace scheduling: A technique for global microcode compaction," *IEEE Trans. Computers,* vol. 30, pp. 478–490, July 1981.

In the context of logic synthesis, the principle of optimizing for the common case was exploited for performance optimization. See L. Benini, E. Maci M. Poncino, and G. De Micheli, 'Telescopic units: A new paradigm for performance optimization of VLSI designs," *IEEE Trans. Computer-Aided Design,* vol. 17, pp. 220–232, March 1998; and S. K. Bommu, N. O'Neill, and M. Ciesielski, "Retiming based factorization for sequential logic optimization," *ACM Trans. Design Automation Electronic Systems,* to appear, 1998. Telescopic unit design transforms fixed-latency pipeline stages into variable-latency circuits, by identifying cases (parts of the input space) for which the output can be evaluated much faster than the original circuit. Thus, the clock period is chosen based on the common case completion time (as opposed to the conventional worst case), leading to significant savings in average (or expected) execution time.

Another related logic-level power reduction technique, called pre-computation, is based on computing some output values of a circuit one cycle in advance, under specific conditions, and disabling the circuit in the present cycle. See M. Aldina, J. Monteiro, S. Devadas, A. Ghosh, and M. Papaefthymiou, "Precomputation-based sequential logic optimization for low power," *IEEE Trans. VLSI Systems,* vol. 2, pp. 426–436, December 1994. Pre-computation was also used to enable re-timing to obtain clock period reductions over and above that obtainable through conventional re-timing.

Though several techniques have been used in conventional systems as noted above, significant reductions in power consumption still needs to be achieved. Unnecessary power consumption does not contribute to the functioning of the circuit; however, they contribute to heat generation. Power consumption should be reduced further to realize the potential offered by sequential circuits in the design of products used daily. For example, reductions in power consumption are required for further miniaturization of appliances like personal computers, remote control devices, etc, because unnecessary power consumption leads to generation of heat that needs to be dissipated out of very small volumes of space. As will be appreciated by a skilled artisan, such excess heat generation presents a problem in smaller sized devices because it is more difficult to conduct the excess heat out. Further, since most of these devices operate on battery power, reduction in power consumption prolongs the battery life and reduces the need of changing/recharging batteries frequently.

II. SUMMARY OF THE INVENTION

To solve the above-mentioned problems in the conventional design techniques for VLSI circuits, it is an object of the present invention to provide a method for designing a computation circuit with reduced power consumption. The problems noted in conventional circuits are addressed in CCC-based design. The advantages of the present invention are realized partially by ensuring that the non-CCC operations do not add any overheads to the implementation of CCC operations. A small amount of add-on circuitry called the common case circuitry is judiciously designed and added to the original RTL design. This add-on circuitry implements the CCCs in an optimized manner. During the implementation of CCCs, the overheads normally involved, like control operations, are avoided.

In order to achieve the objects of the present invention there is provided A method of designing a circuit with reduced power consumption, said method comprising identifying a set of common case computations from a schedule of the circuit, designing add on common detection circuit that detects the set of common case computations, designing add on common case execution circuit that executes the set of common case computations; and integrating the add on circuitry with the original circuit.

Another aspect of the present invention is a method of optimizing a circuit for reduced power consumption comprising simulating a schedule with input traces based on an RTL design, schedule and typical input traces; identifying promising state sequence patterns; extracting behavior corresponding to each promising state sequences; choosing a best pattern; synthesizing common case circuitry; and integrating with original circuit.

Preferably, behavior corresponding to each promising state is determined by deriving compact justification behavior; optimizing computation performed in state sequence; and evaluating power savings obtained by choosing a selected pattern.

Preferably promising state sequences are identified based on a length and coverage of a common case.

Preferably, an occurrence of a state sequence representing a common case $\sigma=\{S_1, S_2 \ldots S_n\}$, is detected using a variable X, the value of X being obtained by performing an AND operation on $c_i$, where $c_i$ represents a transition from $S_i$ to $S_{i+1}$.

Preferably promising state sequences are identified using a parameter:

$$\text{Gain}(\sigma)=N(\sigma)*|\sigma|^2$$

wherein $N(\sigma)$ is the number of occurrences of the common case in an input trace.

Preferably, some infrequent occurrences of the common case are ignored.

Preferably some hard-to-detect occurrences of the common case are ignored.

Another aspect of the present invention is a circuit design system for optimizing a circuit for reducing power consumption comprising: a simulator for simulating a schedule with input traces based on a given RTL design, schedule and typical input traces; a state sequence identifier for identifying promising state sequence patterns from simulated schedules; a behavior extractor for extracting behavior corresponding to each identified state sequences; a pattern selector for choosing a best pattern; a synthesizer for synthesizing common case circuitry; and an output generator for integrating common case circuitry with an original circuit.

III. BRIEF DESCRIPTION OF THE DRAWINGS

The above objectives and advantages of the present invention will become more apparent by describing in detail preferred embodiments thereof with reference to the attached drawings in which:

FIG. 2(a) shows the extracted common case GCD behavior.

FIG. 2(b) shows a simplified common case behavior.

IV. DETAILED DESCRIPTION OF THE PREFERRED EMBODIMENTS

Figure 8:
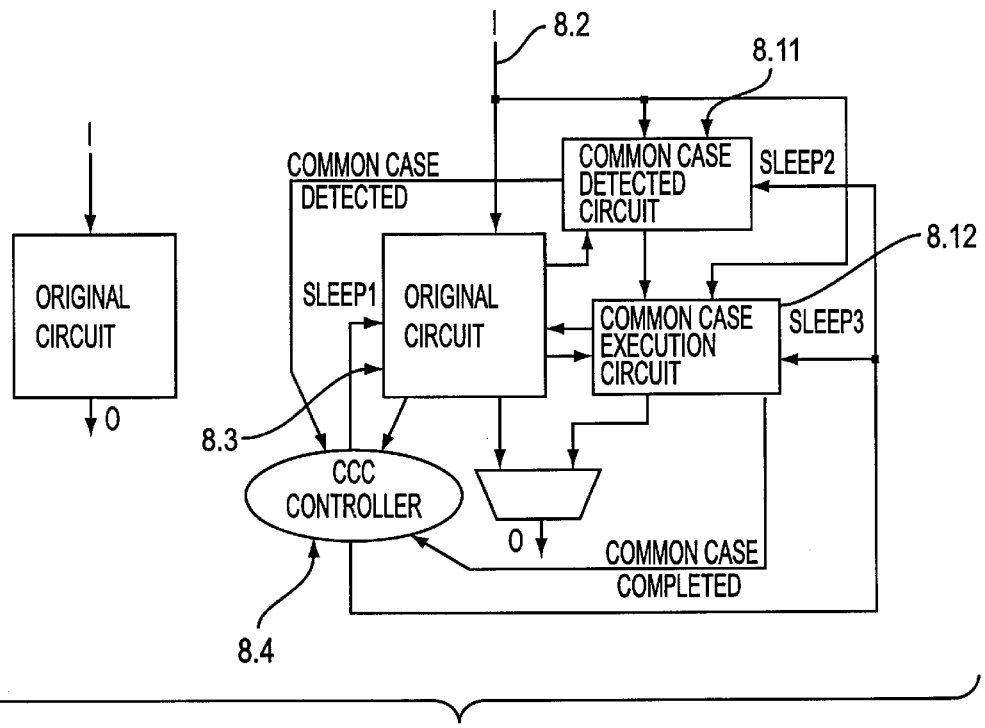
FIG. 8 shows an original circuit and power optimized circuit according to the present invention.

It should be noted that the present invention is not restrictively applied to traditional RTL circuits. It can also be applied in conjunction with traditional high-level synthesis optimizations. FIG. 8 shows an original circuit and an embodiment of the power-optimized circuit according to the present invention. The common case circuitry 8.1 consists of a common case detection circuit 8.11 to detect the occurrence of CCCs, and a common case execution circuit 8.12 to perform all CCC computations. The common case detection circuit uses primary inputs 8.2 and/or internal values from the original circuit to determine whether a common case has occurred. Upon detection of a CCC, the original circuit 8.3 is disabled and the common case execution circuit 8.12 is activated. The common case execution circuit starts with primary input and/or internal values from the original circuit. It generates values for internal variables and/or primary outputs. Upon completion of the operations performed by the common case execution circuit, the original circuit is re-activated to resume its execution.

The overall CCC-optimized circuit has four major components: the general-purpose circuit 8.3, a common case detection circuit 8.11, a common case execution circuit 8.12, and a CCC controller 8.4.

In this embodiment, the general-purpose circuit itself is capable of performing all the functionality (i.e., computations required of the circuit), including the common case computations. In preferred embodiments, the general-purpose circuit implements a subset of the functionality.

The common case detection circuit accepts as inputs, a subset of the primary inputs of the circuit, and evaluates a subset of internal variables in the general purpose circuit. It detects the occurrence of a specific condition, the common case.

The inputs of the common case execution circuit could be any subset of the primary inputs and internal variables in the general-purpose circuit. When activated, it computes a subset of the primary outputs and the values of some internal variables in the general-purpose circuit.

Each of the three components of the power-optimized circuits is designed to support power management by entering into sleep modes. When the sleep input to a circuit is asserted high, its power dissipation is reduced. In such a situation, the power used by the component entering the sleep mode is a relatively small value or zero. A circuit in the sleep mode is restored to active mode, if required, in a subsequent clock cycle by asserting the sleep input to be low.

In a preferred embodiment, the said power management within each component is implemented using a combination of any of known dock gating and operand isolation. Examples of clock gating and operand isolation techniques are described in Benini and G. De Micheli *Dynamic Power Management: Design Techniques and CAD Tools.* Kluwer Academic Publishers, Norwell, Mass., 1997; and A. Raghunathan, N. K. Jha, and S. Dey, *High-level Power Analysis and Optimization.* Kluwer Academic Publishers, Norwell, Mass., 1998. Clock gating ensures that the registers do not load new values and that the clock network does not dissipate power. Operand isolation uses transparent latches to freeze the non-registered primary inputs.

The sleep inputs to the various circuits are generated using a small global controller. Such a sleep input is based on the controller state from the original RTL circuit, the common case detection signal, and a completion signal generated by the common case execution circuit.

An aspect of the present invention is the provisions of automatic techniques to determine which portions of a given behavioral description of a given circuit are the best candidates for implementation as CCCs. Trace analysis is performed to identify commonly occurring operation sequences. Further, the potential for power/delay reduction obtainable by choosing a given set of operations as the CCC is also determined through analysis.

IVA. Detailed Analysis of Common Case Computation Based Designs

IVA.1 Fundamentals

Figure 1A:
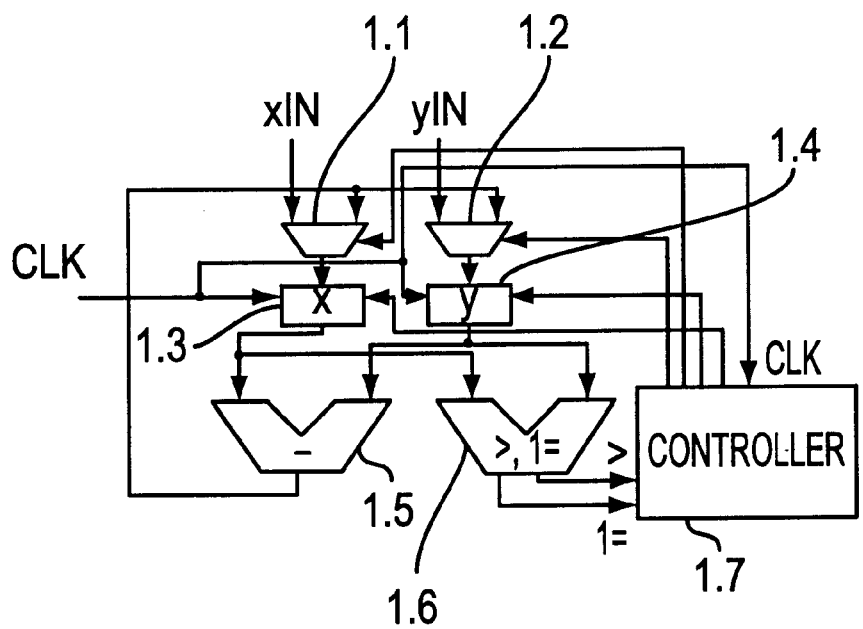
FIG. 1(a) shows an example of a structural RTL implementation for a GCD circuit.

In this section, a detailed analysis using examples, is provided to further explain the design and functioning of the CCC circuit of the present invention. A simple embodiment of the CCC based circuit of the present invention is a design for a GCD circuit as shown in FIG. 1(a). This circuit, whose structural RTL implementation is shown, performs computation of the greatest common divisor of two integers.

In FIG. 1(a), two multiplexers 1.1 and 1.2 receive inputs $x_{in}$ and $y_{in}$ respectively. 1.3 and 1.4 are registers that store values of x and y. Functional unit 1.5 is a subtracter and functional unit 1.6 is both a > as well as !=. 1.7 is a controller that controls this circuit. This circuit computes the value of the GCD of two numbers x and y. The result gets stored in the register 1.3 when the stop state is reached.

Figure 1B:
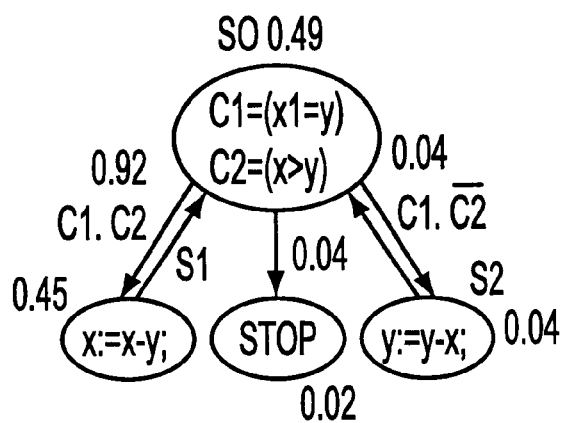
FIG. 1(b) shows a schedule description for the GCD circuit.

The scheduled behavioral description is shown in FIG. 1(b) in the form of a state transition graph (STG). Such a scheduled behavior is also called RTL.

These embodiments are described in the present specification using circuits that represent designs at the functional RTL using a STG. S0, S1, S2, etc., are the states in the STG. Such an STG is annotated with the operations that are performed in each state. In order to assist in determining the CCCs, the vertices and arcs in the STG are annotated with the state and state transition probabilities. For example, in FIG. 1, the probability of a transition from S0 to S1 is 0.92. Likewise, the probability of state S0 is 0.49. These probabilities are determined by known simulation techniques using a conventional input test bench. As should be clear to a skilled artisan, the computation performed by the circuit is equivalent to by traversing the STG.

One or a more candidate state sequences or patterns are identified from the simulation traces of the original design. From the state transition probabilities in the STG of FIG. 1(b), it should be clear to a skilled artisan that states S0 and S1 have high state probabilities (0.49 and 0.45, respectively), as do the transitions between them (0.92). Further automatic analysis of the GCD design and its execution traces during simulation, using known techniques, shows that the sequence of states S0, S1, S0, S1, S0, S1, S0, S1 is a promising state sequence to derive a CCC circuit.

The behavior induced by the above candidate state sequences and its execution condition is then extracted, as explained below. The behavior induced by a state sequence in a schedule (denoted by an STG) is defined as the set of operations that are executed when the given state sequence is traversed in the STG. The behavior induced by the state sequence S0, S1, S0, S1, S0, S1, S0, S1 in the schedule of FIG. 1(b) is shown as a control-data flow graph in FIG. 2(a).

Similarly, the execution condition of a state sequence in a schedule is defined as the set of conditions that need to be satisfied in order to traverse the given sequence of states, given that the STG is first initialized to the first state of the sequence. It should be clear to a skilled artisan that, the execution condition of the state sequence S0, S1, S0, S1, S0, S1, S0, S1 in the schedule shown in FIG. 1(b) is the conjunction of the outputs of all eight conditional operations shown in FIG. 2(a).

A naive implementation of the induced behavior and execution condition of a state sequence or common case behavior as a CCC circuit alone can lead to power savings over the original design. However, significantly more power savings can be achieved from exploiting the full potential of CCC-based design of the present invention. As mentioned previously, several additional optimizations that were not implementable in the original design now becomes implementable in the CCCs. Thus, an important step in the CCC-based design methodology of the present invention is to further optimize the common case behavior aggressively using known power and performance optimization techniques.

Since the common case operations extracted from the schedule are represented at the behavior level, a natural choice is to use any of known behavioral transformations techniques to simplify them. Examples of known behavioral transformation techniques can be found in A. P. Chandrakasan, M. Potkonjak, R. Mehra, J. Rabaey, and R. Brodersen, "Optimizing power using transformations," *IEEE Trans. Computer-Aided Design,* vol. 14, pp. 12–31, January 1995. Various known transformations are now applied to minimize the number of operations and the critical path related to the common case behavior.

It should be noted that two important differences, which make the transformation of the CCCs significantly more powerful than applying transformations on the complete behavior of the original design, are:

When optimizing the common case behavior only the case when the execution condition will be true is considered. Therefore, conditional operations representing the execution condition can be abstracted out. It is thus clear that, the bottlenecks imposed by control-flow constructs to the application of transformations are eliminated.

In optimizing the common case execution condition, a simplified condition which, when true, implies that the original common case execution condition will also be true can often be derived. Thus, the present method is not constrained to implement the entire functionality of the common case execution condition.

For the GCD example, the initial common case behavior is shown in FIG. 2(a). The common case behavior is automatically transformed into the simplify behavior as shown in FIG. 2(b). As can be seen, the sequence of four minus (−) operations has been reduced to one left shift (<<) operation and one minus (−) operation. In addition, the common case execution condition has been simplified from a sequence of four greater-than (>) and four not equal to (!=) operations to a single greater-than(>) operation. A skilled artisan will understand that the reduction in the number of operations leads to power savings.

Such an optimization is not applicable to original design. It is applicable only in the scenarios under which the common case behavior is executed. A method for automatically optimizing the common case behavior according to the present invention are described in subsequently in this specification.

The final, optimized GCD RTL design that contains an implementation of the common-case circuitry is shown in FIG. The circuitry added or modified 3.1 implements the CCC circuitry. In this example, the CCC and execution condition are both implemented using a single subtracter 3.2. Please note that, the condition (x−4y>0) has been implemented using the borrow output of the subtracter.

IV.A.2 Some Factors Involved in Selecting CCCs

This subsection shows that the selection of the common case behavior has a significant bearing on the quality of results obtained. It also demonstrates that it is important to take data statistics need to be considered during CCC selection since they influence the probability of executing the common case behavior.

In general, the following factors need to be considered when selecting common case behavior:

Coverage. The coverage of a state sequence pattern represents the expected fraction of the original design's total processing time that will be spent in executing instances of the pattern. It will be readily apparent that, very small state sequence patterns, involving very few distinct states, are undesirable since they do not exploit an amount of the state space significant enough to result in a large coverage. On the other hand, state sequence patterns that are larger than necessary may have poor coverage since they may be too specialized, i.e., not occur frequently enough. For example, consider the pattern S0 in GCD schedule of FIG. 1(*b*). The coverage of this pattern is equal to the state probability of S0, i.e., 0.49. Note that the coverage of state sequence patterns of length greater than 2 cannot be computed directly from the state and state transition probabilities. The state and state transition probabilities only indicate first order statistics and ignore higher order statistics such as the self and mutual correlations of state transition conditions. Details of conventional state transition probabilities and related computations can be found in G. Casella and R. L. Berger, *Statistical Inference*. Duxbury Press, Belmont, Calif., 1990.

Scope for optimization. As mentioned earlier, once the common case behavior is derived from the chosen state sequence, it is further optimized to minimize power consumption. Typically, longer state sequences lead to behaviors offering more opportunities for optimization. The scope of optimization of the chosen common case is another important factor that needs to be considered in the selection of the common case.

Compactness of common case circuitry. One of the advantages of CCC-based design, as mentioned previously, is that it eliminates a significant amount of the additional circuitry and parasitics activated during the execution of the common case behavior in a conventional non-CCC-based design. These parasitics include multiplexers and control circuitry, clock network and global bus capacitance. These effects rely on the requirement that the common case circuitry is much smaller than the complete design. It should be noted that, it is difficulty to estimate such low-level parasitics as the clock and interconnect capacitance at the behavior level. Therefore, unless such low-level parasitics can be estimated easily, this factor should not be relied on in choosing a state sequence pattern for deriving the common case behavior. Instead, preferably, the techniques of the present invention accept constraints on the number of resources of each type (for example, functional units and registers) that are allowed in the implementation of the common case behavior. Such constraints, provide a way of effectively limiting the size of the common case circuitry.

Figure 4A:
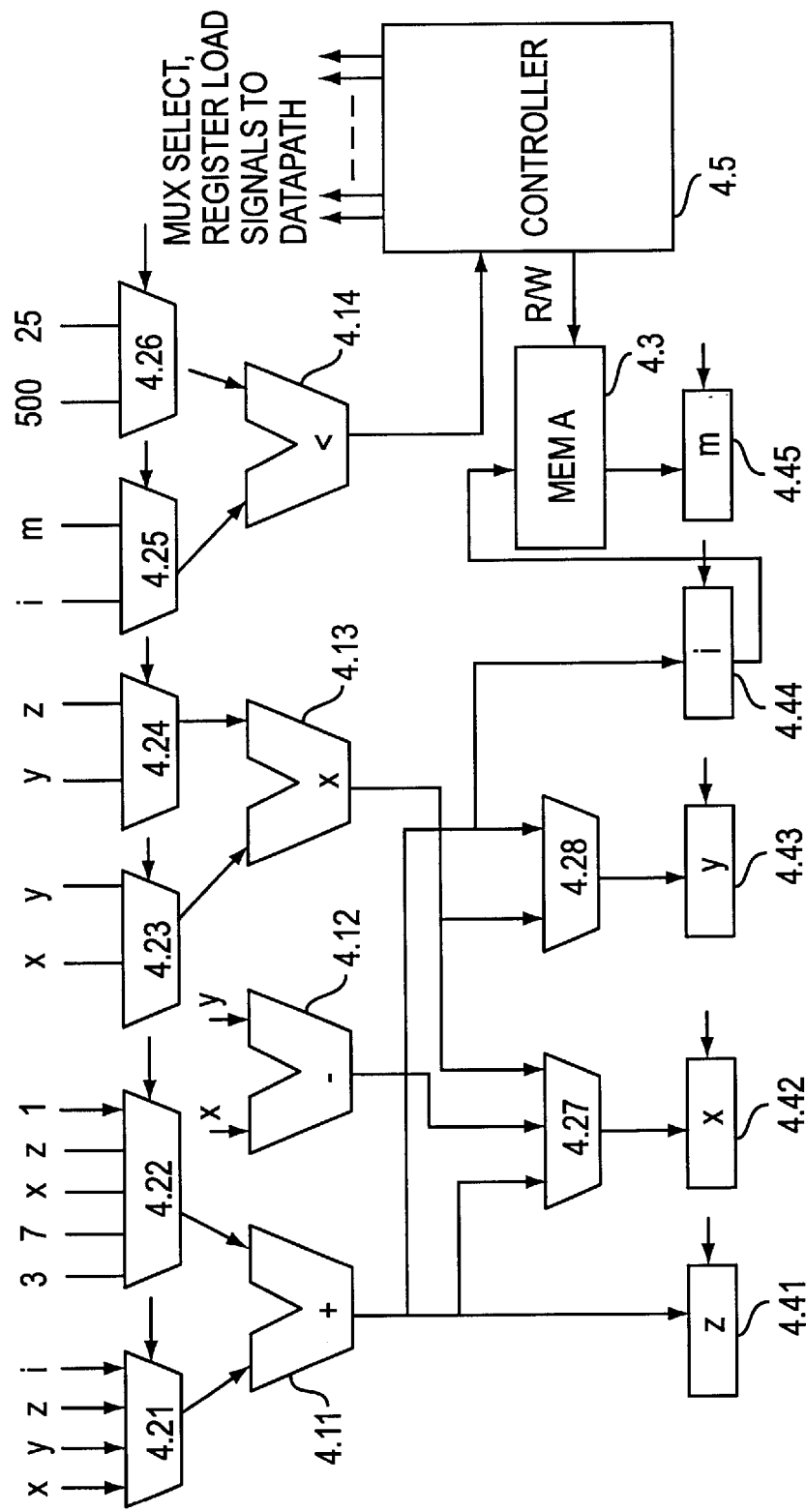
FIG. 4(a) shows an example of a structural RTL implementation for a circuit test1.
Figure 4B:
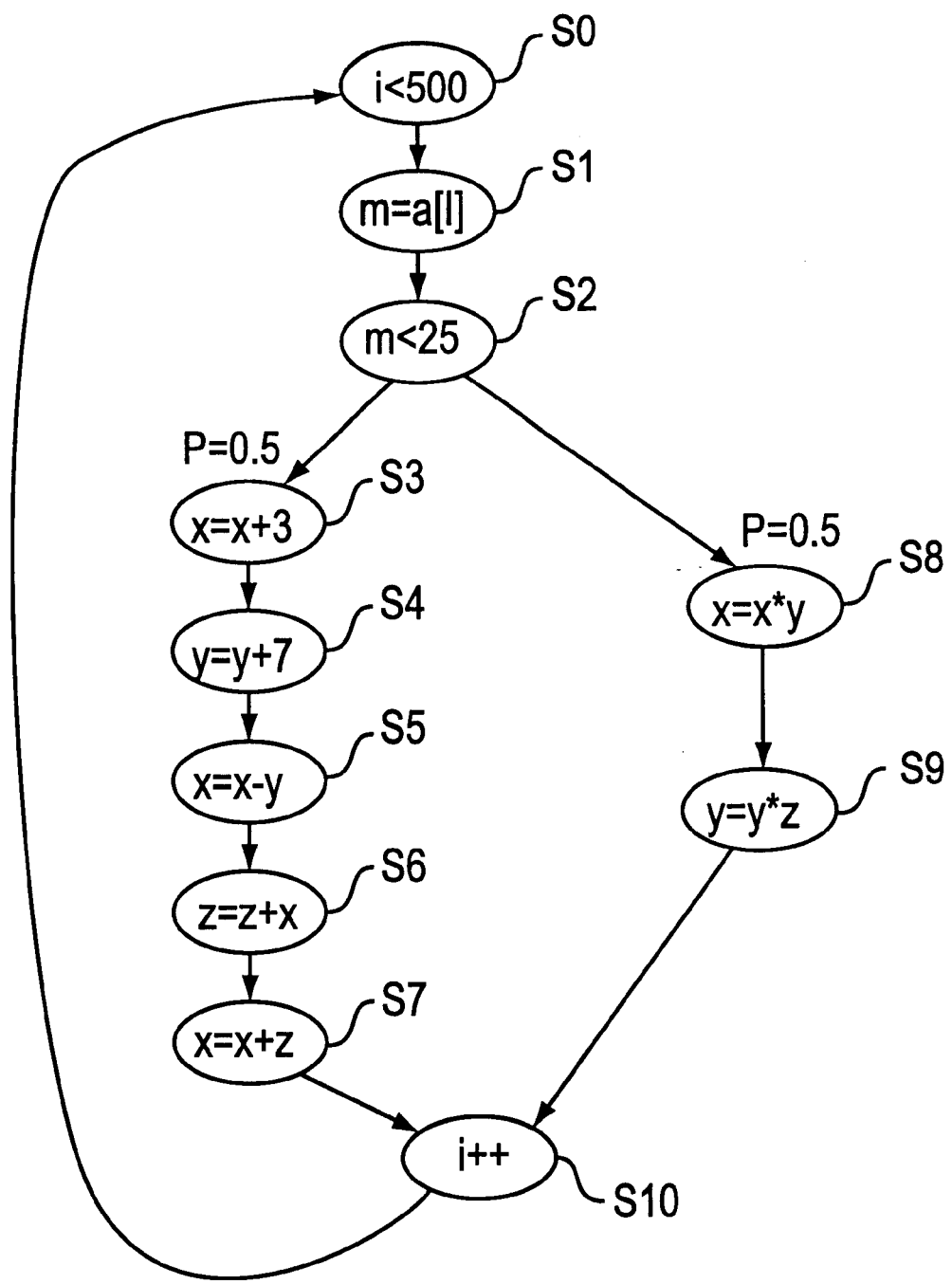
FIG. 4(b) shows a schedule for an example circuit test1.

Another embodiment of the present invention is shown using the circuit of FIG. 4(*a*). This illustration shows that the problem of selecting a state sequence pattern to maximize coverage is a non-trivial one. The schedule for this circuit is shown in FIG. 4(*b*) as an STG. This circuit consists of four functional units 4.11–4.14, eight multiplexers 4.21–4.28, one memory 4.3, five registers 4.41–4.45 and a controller 4.5.

Figure 5:
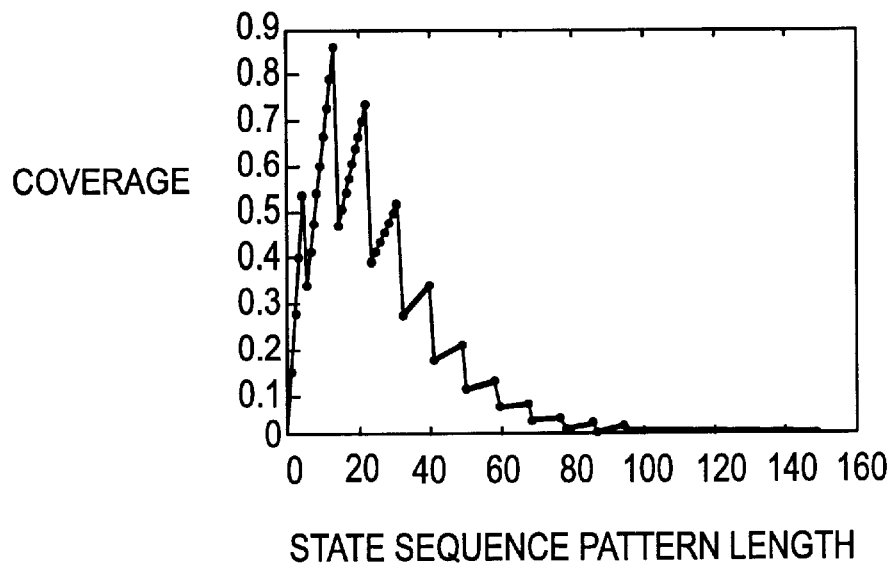
FIG. 5 shows a plot of coverage vs. state sequence pattern length.

The optimal coverage for this schedule is achieved by state sequence patterns of length of less than or equal to 150. The results are presented as plot of coverage vs. pattern length in FIG. 5. The achievable coverage initially increases with pattern length, but starts decreasing after a point. Note that the pattern length 13 in FIG. 5 is only a local optimum, since it is always possible to have the entire simulation state trace as a trivial pattern of coverage 1.0. However, in such a case, the common case behavior chosen will be the same as the original design. Clearly, this will not lead to any power savings. Thus, it is typically necessary to have an upper bound on the length of state sequence patterns considered due to the other factors mentioned above.

Consider again the embodiment (GCD circuit) shown in FIG. 1. The factors involved in choosing an appropriate state sequence pattern are illustrated herein. CCC-based designs for several candidate state sequence patterns of different lengths are obtained and evaluated for performance and power consumption for different simulation test benches having different input distributions. Since the loop involving states S0 and S1 accounts for most of the simulation time, CCC-based designs that use k copies of the loop, i.e., (S0, S1)$^k$ as the chosen state sequence pattern, for various values of k ranging from 1 (representing the original design itself) to 4,096 are considered. Each of these designs are evaluated for energy consumed per GCD computation and performance (time consumed per GCD computation) for five different input traces labeled Trace1, . . . , Trace5.

The input traces are generated as follows. Each input trace corresponds to a fixed number (500) of GCD computations, where each GCD computation may take a different number of cycles depending on the values of inputs x and y. The values of x for all five traces are generated using a uniform distribution between 0 and $2^{20}$. The values of y for Trace1, . . . , Trace5 are generated using uniform distributions between 0 and $2^{16}$, $2^{17}$, . . . , $2^{20}$, respectively.

Figure 6:
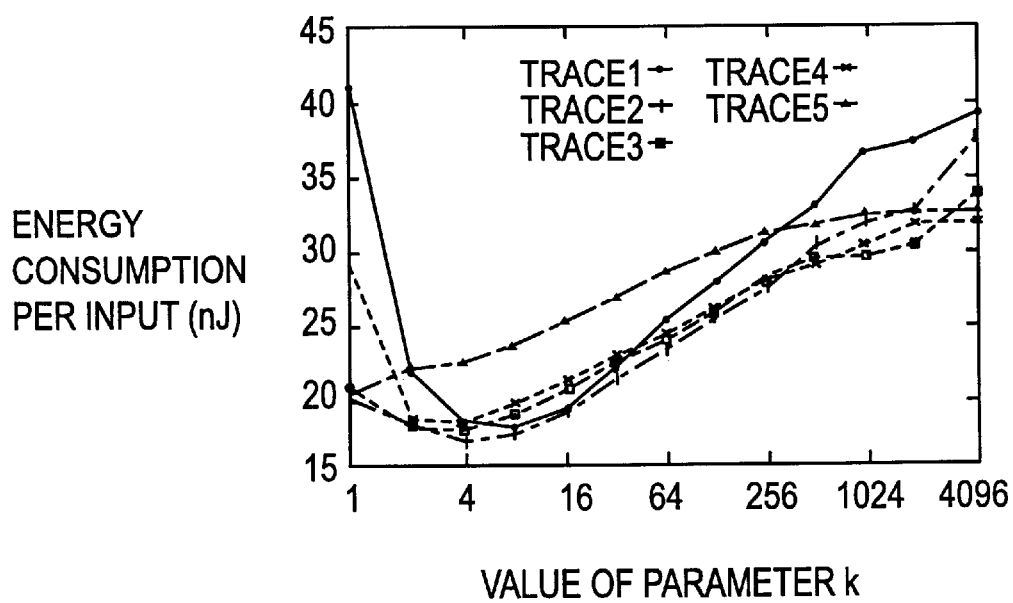
FIG. 6 shows energy consumption of CCC based designs versus state sequence pattern length for different input traces.

The energy results from the above experiments are plotted in FIG. 6. Note that, on the one hand, for Trace5, k=1 leads to the optimum energy consumption, i.e., CCC-based design with other values of k do not result in any power savings. On the other hand, for Trace5 a large energy savings (about 2.3X) is possible compared to the original design. Also, note that for the curves which have optimum energy at k>1 (i.e., at least one CCC-based design is better than the original design), the following observations hold:

(i) the optimum value of k varies depending on the input trace, and (ii) the smallest and largest considered values of k never lead to the best design.

Figure 7:
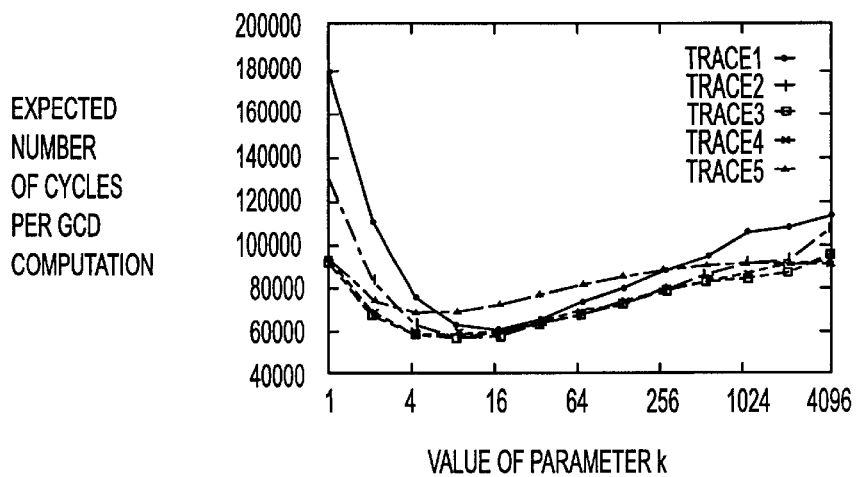
FIG. 7 shows performance of CCC based designs versus state sequence pattern length for different input traces.

FIG. 7 shows results for performance (number of clock cycles) for the same experiments. Again, it is clear that judicious selection of the value of k is necessary to realize the full potential of CCC-based design, and the optimal value of k varies depending on the input data statistics. Another important point illustrated by FIGS. 6 and 7 is that energy and performance optimization are sometimes divergent goals. For example, CCC-based designs derived for all values of parameter k result in performance improvements over the original (non-CCC-based) designs. However, some values of k and input distributions result in CCC-based designs that consume more energy than the original designs. The above example illustrates two key concepts:

There are several (possibly conflicting) factors involved in choosing a common case behavior that leads to maximal power savings.

Input data statistics play an important role in determining the best common case behavior.

Another aspect of the present invention is to explore these factors in choosing a common case behavior that leads to as much power savings as possible.

IVB. The Algorithm for CCC-based Design

In this section, the preferred embodiment of the present invention that embodies details of power optimization technique of the present invention are presented. Section IVB.1 explains the process flow and outlines different steps in the process, and Section IVB.2 explains each step in detail.

IVB.1 The Power Optimization Procedure: An Overview

The inputs and outputs to the power optimization process are as follows. The inputs to the algorithm are an STG representing the schedule, a complete RTL description of the circuit to be optimized, and a set of typical input traces. The output is the RTL circuit augmented with hardware that detects and executes some common cases in a power-efficient manner.

It is to be noted that no assumptions are made about the algorithms employed in high-level synthesis. In such a scenario, the high-level synthesis tool would be used to separately generate the RTL circuitry to implement the common case behavior and remaining parts of the behavior, and the resulting circuits would be composed into a CCC-optimized implementation. In another embodiment the steps in the algorithm of the present invention are incorporated into a conventional high-level synthesis tool.

As noted earlier, FIG. 8 shows the structures of the original and power-optimized circuits in a preferred embodiment. The original circuit is shown on the left, and the optimized circuit is shown on the right.

Figure 9A:
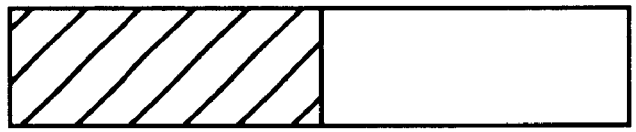
FIG. 9 shows activity of power optimized circuits over time.
Figure 9B:
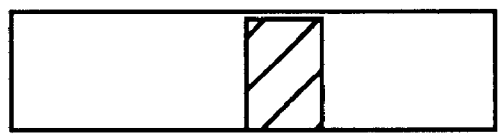
Figure 9C:
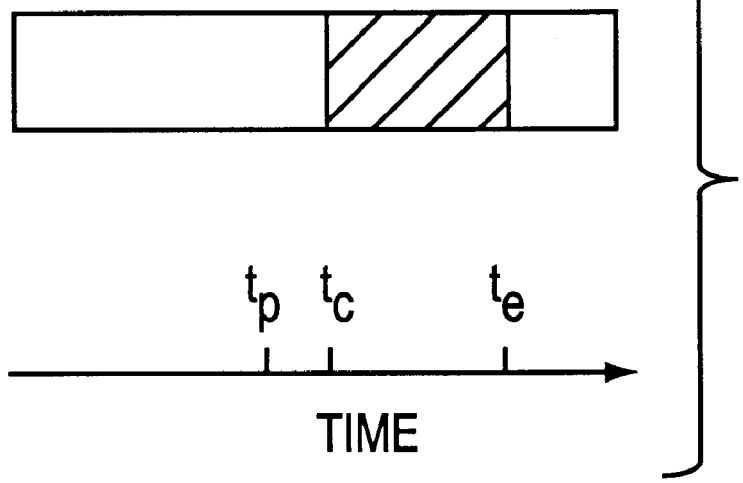

FIG. 9 illustrates the chronology of related events according to an embodiment of the present invention. Rectangles 9(a), 9(b), and 9(c) represent, respectively, the activity of the original circuit 8.3 the common case detection circuit 8.11, and the common case execution circuit 8.12 over time. The shaded regions of the rectangles correspond to activity in the circuit, and the clear regions correspond to inactive or idle time slots. During the idle slots, the component is sent into sleep mode by the controller 8.4. Initially, only the original circuit 8.3 is active. At time $t_p$ the original circuit 8.3 enters into a state which activates the common case detection circuit. The common case detection circuit uses the primary inputs and the values of internal variables in the original circuit 8.3 to test for the occurrence of the common case. This process continues until time $t_c$. Note that, to avoid performance degradation, the original circuit 8.3 continues its computation between times $t_p$, and $t_c$. At time $t_c$, the common case detection circuit 8.11 confirms the occurrence of the common case, and activates the common case execution circuit 8.12. The original circuit 8.3 and the common case detection circuit 8.11 are then de-activated. The common case execution circuit 8.12 completes at time $t_e$, and inputs the appropriate values into the original circuit 8.3, which then resumes normal computation.

Figure 10:
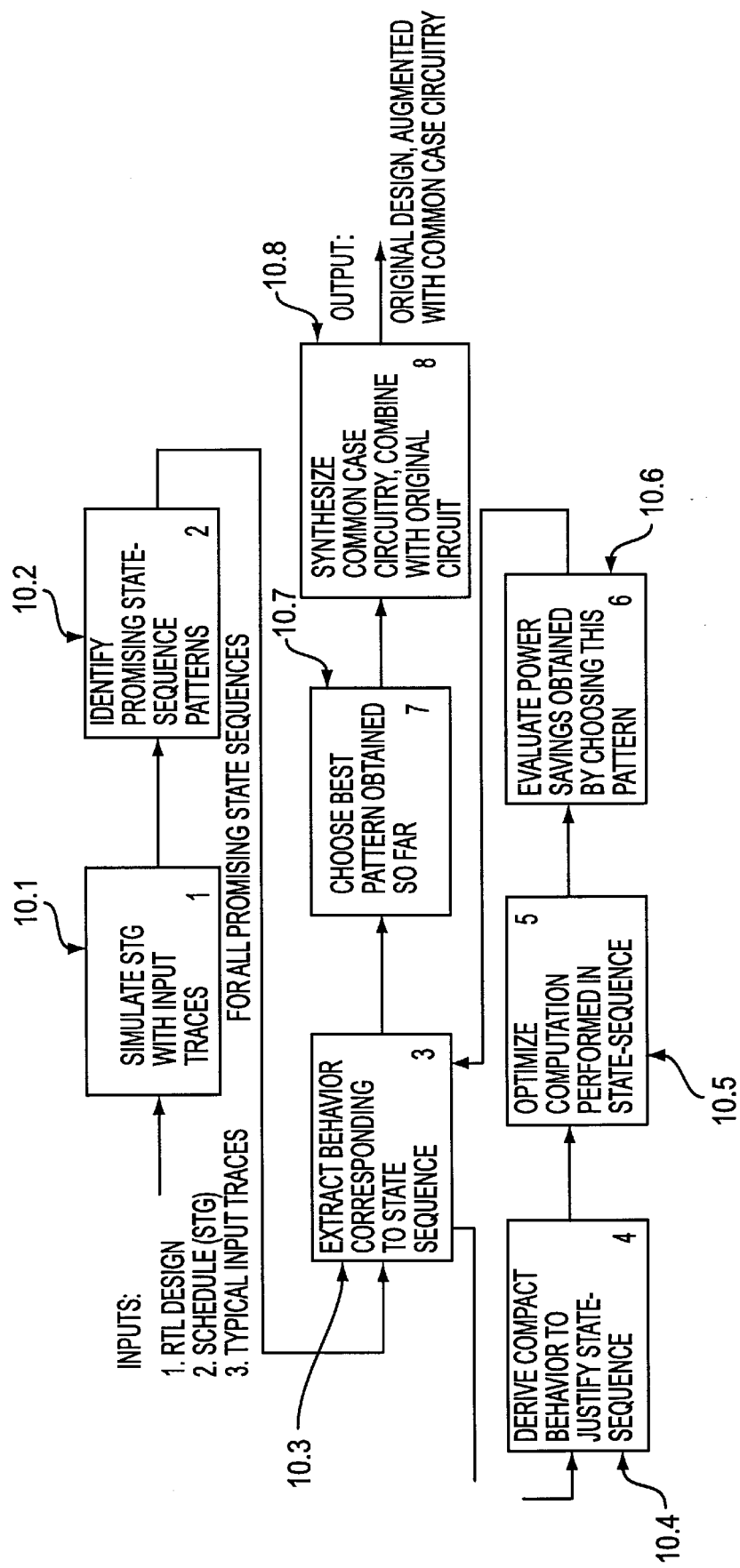
FIG. 10 shows a sequence of steps in the power optimization algorithm.

FIG. 10 shows a preferred embodiment of the method of the present invention. In 10.1 the STG of the circuit is first simulated with the input traces to obtain a sequence, σ, of states. The state sequence is then traversed in 10.2 to identify frequently encountered sub-sequences of states, which potentially constitute good common cases.

The following factors influence the power savings obtained by synthesizing a sequence of states, $\sigma_i$ as common case hardware:

Coverage: This is a measure of the fraction of total execution time the circuit spends on this sequence. Assume that $N(\sigma_i)$ represents the number of non-overlapping occurrences of $\sigma_i$ in σ. The coverage of $\sigma_i$ is expressed by the following equation $$\text{Coverage}(\sigma_i) = N(\sigma_i) \times |\sigma_i|$$

where Coverage ($\sigma_i$) represents the coverage of $\sigma_i$, and $|\sigma_i|$ represents the length of $\sigma_i$. A longer sequence or one with a higher frequency would, naturally, constitute a better selection candidate than a shorter one, or one with a lower frequency, respectively.

Ease of Detection: The ease with which the common case implied by the occurrence of $\sigma_i$ can be detected is an important determinant of the available power savings. As mentioned earlier in this section, while the common case detection circuit is at work, the original circuit continues working in order to avoid performance degradation. As the time taken to detect a common case increases, the time for which the original circuit can be shut off, thereby realizing power savings, decreases. Hence, it is preferable to select a common case whose detection time ($t_c - t_p$) is small.

Simplicity: The power gains achieved by adding common case execution hardware are determined by the simplicity of the common case behavior. Sometimes the common case represents complex behavior requiring significant amounts of hardware to implement. In such a case, when a common case computation is performed, the power consumption of the common case execution circuit might not be significantly lower than that of the original circuit. Preferably, the common case should simplify the general computation significantly to justify the additional cost of extra hardware.

Section IVB.2.1 Describes in Detail How Promising State Sequences are Identified The output of step 10.2 is a set of candidate state sequences that can potentially be synthesized into power-efficient common case circuitry. It is important to note that steps 10.1 and 10.2 cannot identify the best state sequence, but only obtain some promising ones. This is because these steps do not use detailed synthesis information, which is needed to assess the ease of detection. Further, steps 10.1 and 2 do not assess the simplicity of the common case. Therefore, these steps cannot rank closely matched state sequences. Rather, they serve as a filter that protect later stages from having to focus synthesis effort on obviously undesirable state sequences.

Steps 10.3–10.6 are performed for all promising state sequences. Step 10.3 extracts the behavior corresponding to a state sequence. Step 10.4 derives a compact justification behavior for the common case implied by the state sequence. In step 10.4 a set of conditions is derived, which, if satisfied, guarantee the occurrence of the chosen state sequence. This is done by a targeted application of transformations, using a process described in Section IVB.2. Once this is done, the ease of detection of the chosen common case can be assessed. Step 10.5 derives the common case execution circuit. In this step, optimizing transformations are applied to simplify the common case behavior, prior to synthesis.

Power optimizing transformations have been extensively studied in the literature. See A. P. Chandrakasan, M. Potkonjak, R. Mehra, J. Rabaey, and R. Brodersen, "Optimizing power using transformations," *IEEE Trans. Computer-Aided Design*, vol. 14, pp. 12–31, January 1995 See A. P. Chandrakasan, M. Potkonjak, R. Mehra, J. Rabaey, and R. Brodersen, "Optimizing power using transformations," *IEEE Trans. Computer-Aided Design*, vol. 14, pp. 12–31, January 1995, A. Chatterjee and R. K. Roy, 'Synthesis of low power DSP circuits using activity metrics," in *Proc. intl. Conf VLSI Design*, pp. 255–270, January 1994 and G. Lakshminarayana and N. K. Jha, "FACT: A framework for the application of throughput and power optimizing transformations to control-flow intensive behavioral descriptions," in *Proc. Design Automation Conf*, pp. 102–107, June 1998. At the end of this step, the simplicity of the common case circuit can be assessed. It should be noted that sufficient information to estimate the power savings obtainable could be determined from the chosen pattern. Step 10.6 performs such an estimate.

The process described in the previous paragraph is repeated for every sequence identified in steps 10.1 and 10.2. The most promising sequence of states is chosen as the common case. The common case detection and execution circuits for this sequence are then combined with the original circuit in step 10.8 to produce a power-optimized circuit.

The steps shown shaded in FIG. 10 are detailed in Section IVB.2.

IVB.2 The Power Optimization Procedure: Some Details

In this section, preferred embodiments of some steps in the power optimization procedure are described.

IVB.2.1 Common Case Selection (Steps 10.1 and 10.2)

In this subsection, a technique to compare the power savings obtainable from different common cases is described. This comparison technique is used in a procedure that identifies the most promising common cases for further processing. To this end, the power savings obtainable from a common case is modeled. The common case is represented as a state sequence, $\sigma$, of length k. The time, in cycles, taken to recognize this sequence is assumed to be $T_{detect}$. $E_{detect}$ refers to the energy consumed in the detection process. $E_{detect}$ covers the energy consumed over the entire execution of the trace, and includes both "positives" or occurrences of the common case, and "negatives" or non-occurrences. The energy consumed by the original circuit, while performing the common case, is assumed to be $E_{orig}$. Of this energy, $E_{initial}$ is assumed to be consumed in the first Tdetect cycles taken by the original circuit to execute the common case, and $E_{rest}=E_{orig}-E_{initial}$ is consumed in the remaining cycles. The original circuit takes $T_{orig}$ cycles to compute the common case, while the common case execution circuit computes in $T_{common\_case}$ cycles. Also, the common case execution circuit consumes $E_{common\_case}$ units of energy while executing the common case. N is the number of occurrences of the common case in the input trace. Using this notation, the total savings in energy, $E_{saved}$, can be expressed by the equation $$E_{saved}=N\times(E_{rest}-E_{common\_case})-E_{detect} \quad (1)$$

Similarly, the total computation time saved, $T_{saved}$, is expressed by the equation $$T_{saved}=N\times(T_{orig}-T_{detect}T_{common\_case}) \quad (2)$$

The power saved by the power-optimized architecture is now computed. Assume that the original design (without any power optimization) takes T cycles to process the input trace and consumes E units of energy. The power-optimized circuit computes in $T-T_{saved}$ cycles and consumes $E-E_{saved}$ units of energy. If the original and power-optimized designs are provided the same time (number of cycles×clock period) to complete executing the input trace, the time saved by the power-optimized circuit can be traded off for an improvement in power though supply voltage scaling. Therefore, the power $P_{optimized}$, consumed by the power-optimized design, is given by the equation $$P_{optimized}=(E-E_{saved})/T\times(V'_{dd}/V_{dd})^2 \quad (3)$$

where $V_{dd}$ is the original supply voltage and $V'_{dd}$ is the scaled supply voltage. The supply voltage is scaled by using the inverse dependence of the delay of a gate on the supply voltage of the implementation, using the following equation:

$$delay=K\times V_{dd}/(V_{dd}-V_t)^2$$

Here, delay is the delay of a gate, $V_t$ is the threshold voltage, and K is constant for a given technology. See N. H. E. Weste and K. Eshraghian, *Principles of CMOS VLSI design*, 2nd Edition. Addison-Wesley, Menlo Park, Calif., 1994.

From the above analysis, it can be readily seen that the power consumption of the power-optimized circuit depends upon several variables, such as $E_{rest}$, $E_{common\_case}$, $E_{detect}$, $T_{detect}$, and $T_{common\_case}$. These parameters depend on synthesis information. Consider, for instance, the problem of estimating the value of $E_{common\_case}$. To perform such estimation, at least an optimized behavior representing the common case under consideration is required. To obtain such an optimized behavior, the behavior corresponding to the common case is to be extracted. It is then subjected to optimizing transformations. Behavior-level power estimation is then performed to determine the power consumption of the implementation. However, the number of common cases that need to be chosen from is typically extremely large. Even if common cases represented by state sequences of length k are considered, the total number of common cases encountered in the simulation trace is upper-bounded by min $((T-k), n^k)$. Here, n is the number of states in the finite state machine (FSM) representing the input design, and T is the number of cycles in the simulation of the original design. Clearly, it is not possible to estimate $E_{common\_case}$ for every common case under consideration. Therefore, a large number of common cases are pruned, and only a few promising ones are retained for further, and more accurate, processing. At this stage, a simple measure, which can be easily computed on the basis of the available parameters such as length and coverage (defined in Section IVA.2) of the common case is required.

The following metric is chosen:

$$Gain(\sigma)=Coverage(\sigma)\times|\sigma| \quad (4)$$

$$=N(\sigma)\times|\sigma|^2 \quad (5)$$

Note that Gain ($\sigma$) can be easily computed without any knowledge of the behavior represented by the common case. The choice of such a measure is discussed herein. Of two state sequences with equal length, the one that occurs more often is clearly a better choice, if behavioral information is unavailable. The Gain function is, therefore, proportional to N(σ). Consider two different state sequences, σ$_1$, and σ$_2$ which occur 10 and 50 times, respectively. σ$_1$, has a length of 5, and σ$_2$ has a length of 1. If Gain is chosen to be proportional to Coverage(σ), then these two state sequences would be considered equally good. However, a common case that consists of a longer state sequence is likely to be easier to optimize. A behavior extracted from a single state would be extremely difficult to optimize because it has a very short critical path (of one cycle). Therefore, E$_{common\_case}$ and E$_{orig}$ are likely to be close to each other, thus reducing the power savings obtainable. Multiplying Coverage (σ) by |σ| takes into account the increased ability to optimize larger behaviors. Extremely long state sequences are, however, undesirable because they add to the complexity of the common case detection and execution circuits, thus increasing the overall power consumption of the design. Therefore, an upper bound is placed on the length of the common case using a small, user-defined constant. In the experiments performed by the inventors, a bound of 32 on the length of the common case yielded good results.

As mentioned before, the procedure outlined for comparing common cases is approximate and therefore, does not hone in on an individual common case. However, a small number of highly ranked common cases are selected for further evaluation. The rankings are generated by an 0(T) procedure, where T is the number of states traversed by the FSM while simulating the input trace.

IVB.2.2 Common Case Detection and Simplification (Step 10.4)

In this subsection, how to detect and simplify in advance, the occurrence of a state sequence that represents the chosen common case is explained. Consider a sequence of states, σ={S$_1$, S$_2$, ..., S$_n$}, whose occurrence needs to be detected. Let c$_i$ represent the condition for a transition from state S$_i$ to S$_{i+1}$. χ is a Boolean variable, which is true if and only if σ occurs. Clearly, $$\chi = \bigcap_{i=1}^{n} c_i$$

In the above expression an AND operation is performed on all the conditions. When an instance of the common case is detected, the common case execution hardware is activated. Therefore, it is critical that the simplified behavior does not incorrectly report the occurrence of a common case. However, to improve ease of detection, the detection process might choose to ignore some hard-to-detect and infrequent occurrences of the common case. Therefore, the output, χ', of the detection process is required to be true only if χ is true. It is hard to find a general simplifying procedure, which works for all behaviors.

By performing experiments, some promising directions for simplification are identified. Specifically, the existence of implications between the c$_i$'s for many of the benchmarks used are noted. A true value on c$_{i1}$ often guarantees a true value on c$_{i2}$ (i1≠i2). In this case, c$_{i2}$ can be removed from the detection process. Therefore, the operations that are responsible only for its generation can also be removed, thus simplifying the behavior. The following example illustrates a practical application of this optimization.

Figure 11:
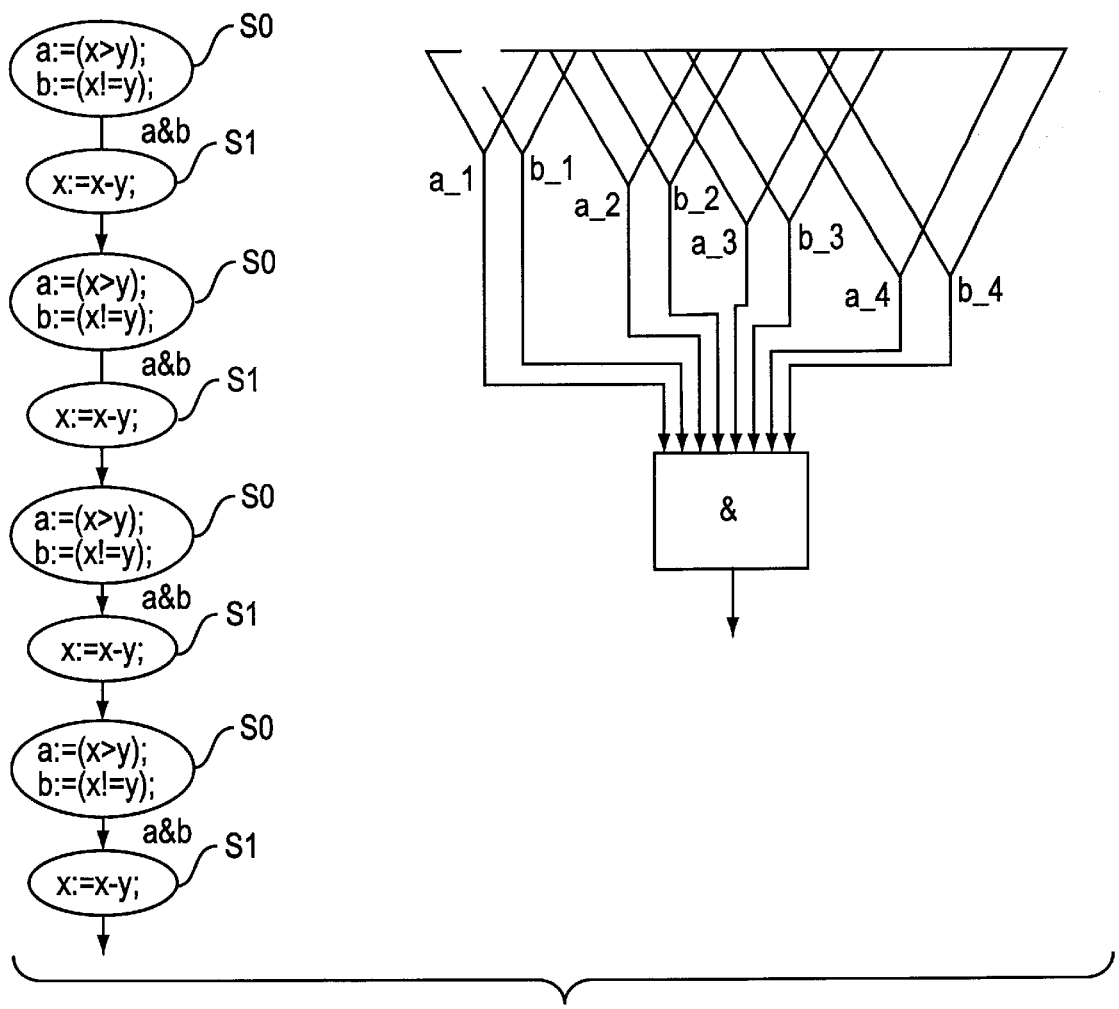
FIG. 11 illustrates an example showing common case detection.

Consider the problem of detecting the following sequence of states: σ$_1$={S0, S1, S0, S1, S0, S1, S0, S1} in the GCD STG embodiment shown in FIG. 1(b). FIG. 11 (a) shows this state sequence, and details the operations performed in it, and FIG. 11 (b) represents the conditions for its occurrence. In FIG. 11 (b), the conditions that need to be satisfied for σ$_1$ to occur are shown as the outputs of cones of functionality. Each output cone represents the output at the end of a state. An AND operation is performed on these conditions (a__i and b__i 1≤i≤4) to detect σ$_1$. The behavior shown in FIG. 11 (b) is now simplified. As a first step in the simplification, expressions for the a__i's and the b__i's are written in terms of the values of variables in the design at the beginning of the detection process.

$$a\_1=(\chi>y) \quad b\_1=(\chi \neq y) \tag{6}$$

$$a\_2=(\chi-y>y) \quad b\_2=(\chi-y \neq y) \tag{7}$$

$$a\_3=(\chi-2y>y) \quad b\_3=(\chi-2y \neq y) \tag{8}$$

$$a\_4=(\chi-3y>y) \quad b\_4=(\chi-3y \neq y) \tag{9}$$

Implications between these conditions are now noted. It should be noted that x>0 and y≥0 (since they are both represented as unsigned integers, their values are non-negative). Here, the following is true $$a\_4 \rightarrow a\_3 \rightarrow a\_2 \rightarrow a\_1 \tag{10}$$

Figure 12A:
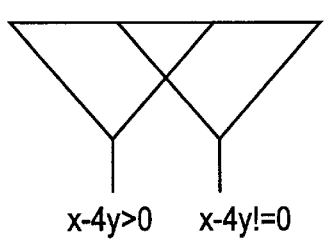
FIG. 12 shows an example of simplification of the common case detection.
Figure 12B:
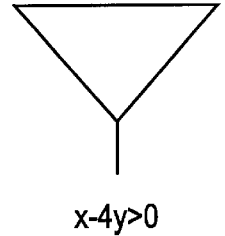

It should be noted that if x−3y>y, then x−2y>y because x−3y<x−2y if x≥0 and y≥0. Similarly, other implications in Equation (10) can be derived. It should also be noted that a__i →b__i where 1≤i≤4. Therefore, if a__4 is true, all the conditions needed for the occurrence of σ$_1$ are satisfied. Hence, the behavior shown in FIG. 11 (b) is equivalent to the behavior shown in FIG. 12(a), and is further simplified to the behavior shown in FIG. 12(b).

The above example illustrated the application of the principles outlined in this subsection to drastically simplify the common case detection behavior. The ability to perform such simplification depends, to a large extent, on the availability of powerful analytical tools. Equation solvers, which constitute the core of these techniques, have been extensively studied in the context of several important problems in high-performance compiler design. Memory disambiguation, which attempts to infer dependencies between a write to a memory and a subsequent read, is one such problem. Tools such as the OMEGA calculator have been developed to solve these problems, and can be easily utilized for checking implications between different conditions and performing the appropriate simplifications. See The OMEGA Calculator and Library. Department of Computer of Computer Science, University of Maryland, College Park, November 1996. However, due to the nature of the problem (the general problem of implication checking is undecidable), it is not possible to guarantee finding of solutions in every case even if they exist. However, for all the examples detailed above, common case detection is drastically simplified through the use of relatively straightforward equation solving techniques.

IVC. Circuit Design System

Figure 13:
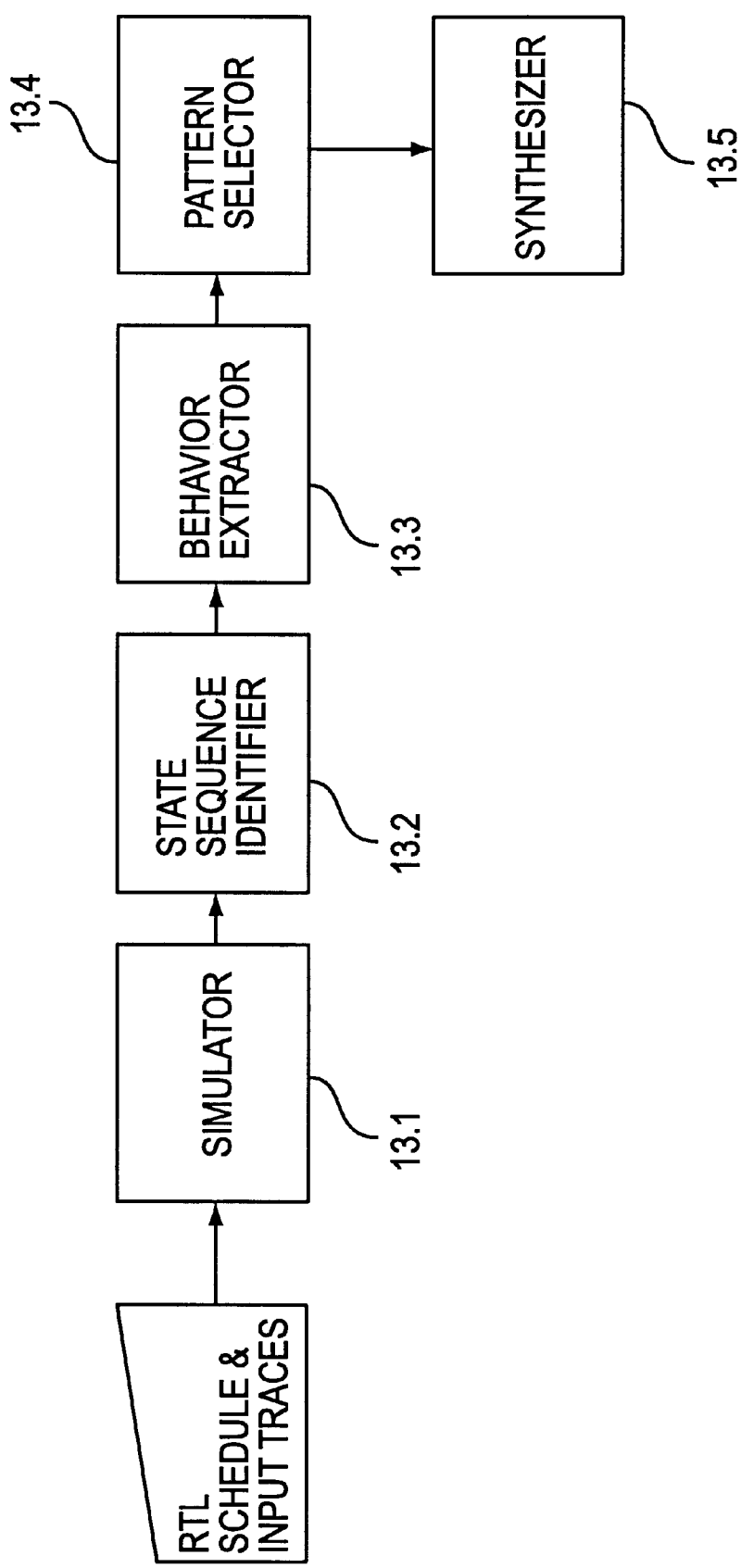
FIG. 13 shows a preferred embodiment of a circuit design system according to the present invention.

FIG. 13 shows a preferred embodiment of a circuit design system according to the present invention. A simulator 13.1 receives an RTL design, a schedule and typical input traces for an original circuit. It simulates the schedule based on these inputs. A state sequence identifier 13.2 identifies promising state sequence patterns from the simulated schedules. A behavior extractor 13.3 extracts behaviors corresponding to each state sequences identified by the state sequence identifier. A pattern selector 13.4 chooses a best pattern and a synthesizer synthesizes common case circuitry.

An output generator 13.5 integrates the common case circuitry with the original circuit.

IVD. Experimental Results

Figure 3:
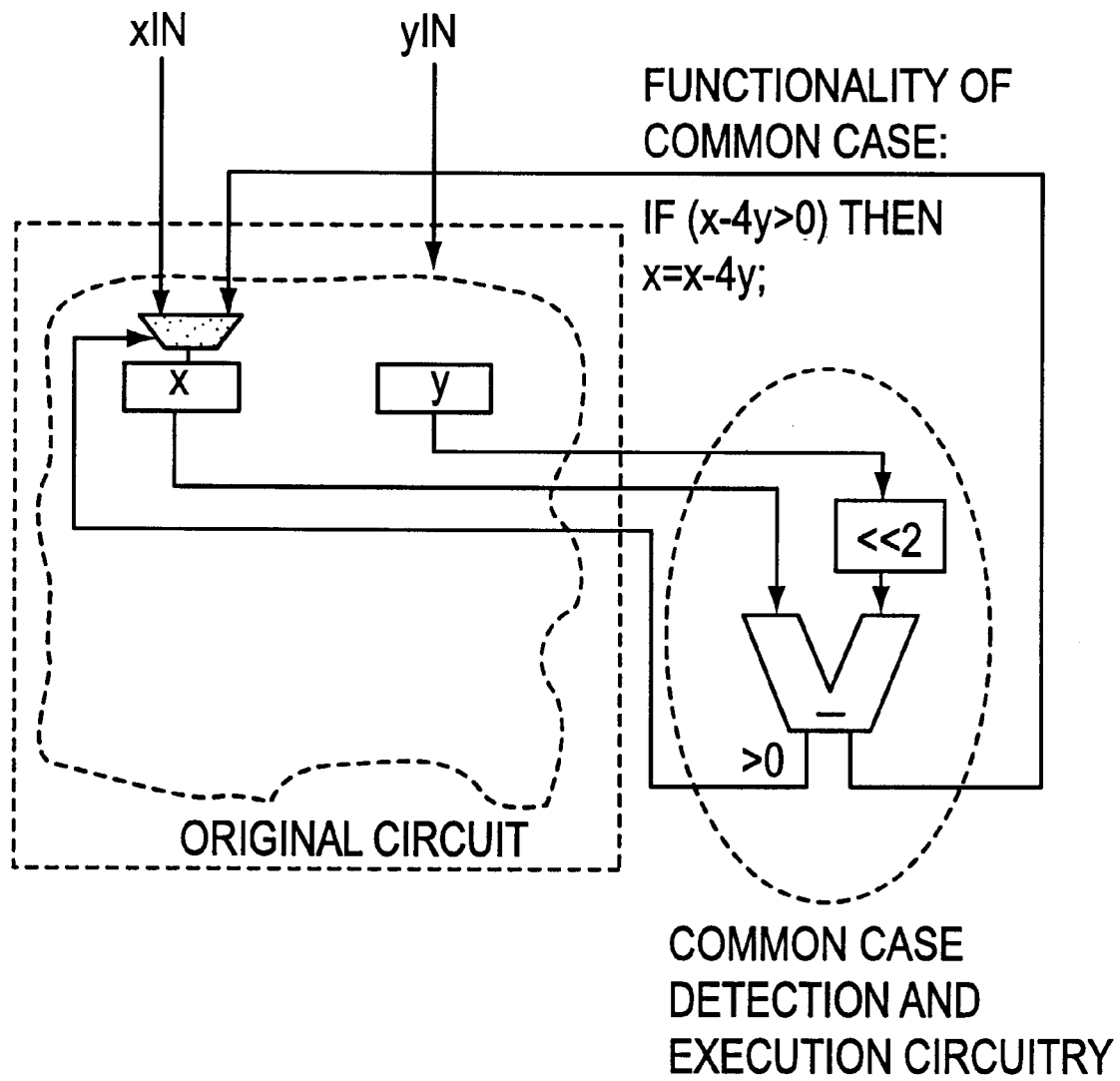
FIG. 3 shows an optimized GCD design including CCC circuitry.

The original GCD RTL circuit shown in FIG. 1(a) and the CCC-optimized RTL circuit shown in FIG. 3 were synthesized using a conventional logic synthesis tool to evaluate the benefits of the present invention. The synthesis was then mapped to a commercial gate array library. A technology-mapped gate-level power simulation tool was used to estimate the average energy consumption per input. In such a case, an input represents a pair of values whose GCD is computed using the circuit. The average energy per input for the original design was found to be 11.05 nJ, and for the CCC-optimized design was found to be 4.46 nJ representing an energy savings factor of 2.48X. In addition, the average amount of time (number of clock cycles*clock period) per input was found to be 4285 ns and 1003 ns, respectively, for the original and CCC-optimized design, a performance improvement of 4.27X. Such a performance improvement can be translated into additional power savings through supply voltage scaling or further switched capacitance optimization. For example, the supply voltage of the CCC-optimized design can be scaled to 2.3V from 5V, bringing the total energy savings to 12.08X, for the same performance of the original design.

Additionally, the CCC-based power optimization technique was applied to several example circuits. Scheduling and binding information was available for all circuits. The STGs representing the schedules of the example circuits were analyzed to detect common cases, and the most promising common case was chosen for synthesis. The original circuits were modified by adding common case detection and execution circuitry. The original and power-optimized RTL descriptions were mapped to gate-level netlists using an in-house synthesis tool. The resulting gate-level circuits were compared with respect to the following metrics: area, performance, and power. The results obtained are summarized in Tables 1 and 2.

The optimized designs are faster than the original designs. The power consumption of the original and the optimized designs are computed in the following manner when $V_{dd}$-scaling is not performed. For the original design, the energy, $E_{orig}$, consumed while executing the input trace is divided by the time, $T_{orig}$, in cycles, taken for executing the trace, to determine the power consumption. The power-optimized design is assumed to consume $E_{opt}$ units of energy and operate for $T_{opt}$ cycles, where $T_{opt}$ is less than $T_{orig}$. In this case, the optimized design is assumed to operate for $T_{orig}$ cycles, while being in an inactive (zero energy) state for $T_{orig}-T_{opt}$ cycles. Therefore, the power consumption is given by $E_{opt}/T_{orig}$. If $V_{dd}$-scaling is performed, the optimized design is assumed to take the same time as the original design. This enables us to use the following equation to scale the supply voltage $$\frac{V_{dd}initial}{(V_{dd}initial - V_t)^2} \times T_{orig} = \frac{V_{dd}new}{(V_{dd}new - V_t)^2} \times T_{new}$$

where $V_{dd}$ initial is the initial supply voltage, $V_{dd}$ new is the new supply voltage, and $V_t$ is the threshold voltage of the implementation. The power consumption is obtained using the new supply voltage.

In Table 1, major columns circuit, area and # cycles represent the name of the design, the area and the expected number of clock cycles to process one input, respectively. Minor columns original, optimized, respectively, the original design and the optimized design. Column A.O represents the area overhead incurred by our technique, and column P.I represents the improvement in performance. Similarly in Table 2, major columns circuit, power (non-$V_{dd}$-scaled), and power ($V_{dd}$-scaled) represent the name of the design and the power consumption, without and with $V_{dd}$-scaling. Column P.S represents the savings in power consumption.

In the examples presented, GCD is a well-known benchmark. Poly represents the computation of a polynomial, and Test1 represents the behavior shown in FIG. 4. Linegen and Graphics are parts of an in-house graphics controller ASIC.

TABLE 1

Area and performance results

| Circuit | Area (units) | | | # cycles | | |
|---|---|---|---|---|---|---|
| | original | optimized | A.O(%) | original | optimized | P.I(%) |
| GCD | 3647 | 4706 | 29.0 | 428,460 | 100,310 | 82.6 |
| Poly | 16,801 | 19,232 | 14.4 | 1,760,000 | 1,445,000 | 17.9 |
| Test1 | 10,163 | 12,386 | 21.9 | 338,300 | 194,600 | 42.5 |
| Linegen | 3340 | 4126 | 23.5 | 718,000 | 406,800 | 43.3 |
| Graphics | 5894 | 7644 | 29.7 | 159,800 | 116,000 | 27.4 |

TABLE 2

Power results

| Circuit | Power (mW) (non-$V_{dd}$-scaled) | | | Power (mW) ($V_{dd}$-scaled) | |
|---|---|---|---|---|---|
| | original | optimized | P.S(%) | optimized | P.S(%) |
| GCD | 2.59 | 1.04 | 59.0 | 0.22 | 91.6 |
| Poly | 55.57 | 23.23 | 58.2 | 17.98 | 67.7 |
| Test1 | 23.74 | 12.20 | 48.6 | 6.17 | 74.1 |
| Linegen | 8.96 | 5.40 | 39.7 | 2.69 | 70.0 |
| Graphics | 18.48 | 16.19 | 14.1 | 10.77 | 41.8 |

The results indicate that the power optimization procedure of the present invention produces circuits that perform significantly faster or consume significantly lower power than the original designs. On an average, the circuits produced from the techniques used in the present invention consumed 69.0% (43.9%) less power than the original circuits when $V_{dd}$-scaling was (was not) performed, at an average area overhead of 23.7%. Likewise, the circuits produced from the techniques used in the present invention consumed 43.9% less power than the original circuits when $V_{dd}$-scaling was not performed. The optimized circuits performed, on an average, 42.7% faster than the original circuits. Note that the optimized circuit is faster only when $V_{dd}$-scaling is not performed. $V_{dd}$-scaling trades off performance improvement for increased power savings.

Experimental results on several benchmarks indicated that CCC-based design led to large power (and energy) improvements, ranging from 14.1% to 59.0% (average of 43.9%). Also, performance improved for all the circuits by 17.9% to 82.6% (average of 42.7%). Even larger power savings are possible if the performance improvements are exploited for supply voltage scaling (average of 69%) or further switched capacitance reduction. This shows that, CCC-based design is a highly effective design technique that can be easily integrated into existing high-level /RTL synthesis frameworks.

The technique of the present invention has several distinguishing features from all the conventional techniques described in the background section. Power savings and performance improvements are obtained in such a structure because the common-case execution circuitry is tailored to the CCC, without the restrictions mentioned earlier. It should be noted that, the add-on circuitry results in an area overhead. However, such overhead can be reduced by keeping the size of the add-on circuitry as small as possible. Judicious CCC selection and synthesis needs to be performed to ensure that maximum power and performance benefits are obtained. Further, such a judicious selection is also required to ensure that the area overheads are minimized.

Conventional RTL and behavioral synthesis techniques for low power do not specifically consider CCCs during synthesis. Therefore, the implementations produced by conventional techniques suffer from one or more of the drawbacks mentioned before. The techniques of the present invention can be used in conjunction with existing RTL or high-level synthesis techniques for reducing power consumption. Existing techniques can be applied to both the original and common case detection and execution circuits that are part of the structure of the present invention.

It should be noted that the techniques of the present invention are much more coarse-grained and global in their scope of optimization compared to some of the conventional techniques. Further, the conventional precomputation or telescopic units can be applied for power or performance optimization across one or a few clock cycle boundaries only (e.g., a typical application is to a single functional unit). On the other hand, techniques of the present invention can extract and optimize CCC threads that consist of paths that span several (tens or hundreds) of clock cycles. Thus, the present invention requires different design flow contexts and scope of optimization.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of designing a circuit with reduced power consumption, said method comprising:

identifying a set of common case computations from a schedule of the circuit;

designing add on common case detection circuit that detects the set of common case computations;

designing add on common case execution circuit that executes the set of common case computations; and integrating the add on circuitry with the circuit.

2. A method of optimizing a circuit for reducing power consumption in the circuit comprising:

a) simulating a schedule with input traces based on an RTL design, schedule and typical input traces;

b) identifying promising state sequence patterns from the result of step a;

c) extracting behavior corresponding to each state sequences identified in step b;

d) choosing a best pattern;

e) synthesizing common case circuitry, wherein the common case circuitry implements the best pattern; and f) integrating the synthesized common case circuitry with original circuit.

3. The method of claim 2 wherein step c comprises:

(c) (i) deriving compact justification behavior;

(c)(ii) optimizing computation performed in state sequence; and (c)(iii) evaluating power savings obtained by choosing a selected patter.

4. The method of claim 2 wherein promising state sequences are identified based on a length and coverage of a common case.

5. The method of claim 4 wherein promising state sequences are identified using a parameter:

$$\text{Gain}(\sigma) = N(\sigma) * |\sigma|^2$$

wherein $N(\sigma)$ is the number of occurrences of the common case in an input trace.

6. The method of claim 5 wherein some infrequent occurrences of the common case are ignored.

7. The method of claim 5 wherein some hard-to-detect occurrences of the common case are ignored.

8. The method of claim 2 wherein an occurrence of a state sequence representing a common case $\sigma = \{S_1, S_2 \ldots S_n\}$, is detected using a variable X, the value of X being obtained by performing an AND operation on $c_i$, where $c_i$ represents a transition from $S_i$ to $S_{i+1}$.

9. A circuit design system for optimizing a circuit for reducing power consumption in the circuit comprising:

a simulator for simulating a schedule with input traces based on a given RTL design, schedule and typical input traces;

a state sequence identifier for identifying promising state sequence patterns from simulated schedules;

a behavior extractor for extracting behavior corresponding to each identified state sequences;

a pattern selector for choosing a best pattern;

a synthesizer for synthesizing common case circuitry, wherein the common case circuitry implements the best pattern; and an output generator for integrating the synthesized common case circuitry with an original circuit.

* * * * *

UNITED STATES PATENT AND TRADEMARK OFFICE
CERTIFICATE OF CORRECTION

PATENT NO.     : 6,308,313 B1
DATED          : October 23, 2001
INVENTOR(S)    : Ganesh Lakshminarayana et al.

It is certified that error appears in the above-identified patent and that said Letters Patent is hereby corrected as shown below:

<u>Title page,</u>
Item [73], Assignees to read as follows:

-- [73]  Assignees:     NEC USA, Inc., Princeton, NJ, and
                        Princeton University, Princeton, NJ --

Signed and Sealed this

Eighth Day of April, 2003

JAMES E. ROGAN
*Director of the United States Patent and Trademark Office*